United States Patent [19]

Roedel

[11] 3,846,358

[45] Nov. 5, 1974

[54] PROCESS FOR PRODUCING SILICONE RESINS

[75] Inventor: George F. Roedel, Schenectady, N.Y.

[73] Assignee: General Electric Company, Waterford, N.Y.

[22] Filed: Sept. 20, 1973

[21] Appl. No.: 399,072

[52] U.S. Cl..... 260/18 S, 117/161 ZA, 260/31.2 R, 260/33.4 SB, 260/33.6 SB, 260/46.5 R, 260/448.8 R
[51] Int. Cl............................................. C08k 1/66
[58] Field of Search . 260/46.5 R, 448.8 R, 33.4 SB, 260/18 S, 31.2 R, 33.6 SB

[56] References Cited
UNITED STATES PATENTS
3,668,180  6/1972  Brennan........................ 260/46.5 R

*Primary Examiner*—Melvyn I. Marquis
*Attorney, Agent, or Firm*—Donald J. Voss; E. Philip Koltos; Frank L. Neuhauser

[57] ABSTRACT

A process for producing a silicone resin comprised of trifunctional and difunctional units comprising partially hydrolyzing and alkoxylating an organohalosilane mixture with an alcohol and water such that the alkoxylated product contains from 5 to 40 percent by weight of alkoxy groups; adding additional alcohol to the alkoxylated product and removing acid by distillation procedures; adjusting the acidity of the alkoxylated organohalosiloxane intermediate such that it contains 1 to 300 parts per million of acid; adding additional water and alcohol so as to hydrolyze the alkoxylated organohalosiloxane and adjusting the resulting hydrolyzate which is the desired silicone resin to the desired solids content.

11 Claims, No Drawings

PROCESS FOR PRODUCING SILICONE RESINS

BACKGROUND OF THE INVENTION

The present invention relates to a process for forming a silicone resin and more particularly the present invention relates to a process for forming a silicone resin composed of trifunctional units and difunctional units by the use of an alcohol and water.

In the early stages of silicone resin development when it was desired to produce a silicone resin composed of trifunctional units and difunctional units, the practice was to utilize organohalosilane reactants and simply add the organohalosilane reactants to water. Although resins could be produced this way, the resins so produced tended in many cases to gel in production, that is, the silicone resin that was formed in the water mixture tended to be extremely unstable and tended to gel. In addition, the silicone resin that was formed was not soluble in the water hydrolysis medium and clumps of silicone resin tended to precipitate from the hydrolysis solution, such clumps not being suitable for most silicone resin applications. In addition, the simple addition of organohalosilanes to a water medium resulted in the formation of high acid concentrations in the hydrolysis medium which excessive amounts of acid that was formed tended to make the silicone resin as it was being formed in the hydrolysis medium unstable as well as causing it to condense out silanol groups such that the final silicone resin product had a low hydroxyl content.

To solve this problem, innovators in the field adopted the procedure of using an organic solvent in addition to water in the hydrolysis medium. The organic solvent tended to decrease the acid concentration in organic phase which decreased the tendency of the silicone resin that was formed to gel, as well as dissolve the silicone resin in the organic solvent phase as it was being formed, thus, facilitating separation of the final resin product. However, the disadvantages with the use of such organic solvents was that these organic solvents in the hydrolysis medium were required in large concentrations, thus increasing the cost of preparing the silicone resin as well as being very difficult to purify and recycle in the silicone resin process after they had been used. Accordingly, several innovators in the field decided to use completely alkoxylated silanes rather than organohalosilanes as the starting material in the production of silicone resins containing trifunctional units and difunctional units. Examples of such processes are to be found in U.S. pat. Nos. 3,389,114, 3,262,830 and 3,304,318. However, the difficulty with such processes as that disclosed in the above patents was that they required in many cases other ingredients besides the water and alkoxylated silane. In addition, the alkoxylated silane is a much more expensive initial ingredient than an organohalosilane. Accordingly, it is presently an objective in the silicone resin field to produce a silicone resin containing trifunctional units and difunctional units efficiently and cheaply which silicone resin during production will not tend to gel and which silicone resin may have a high hydroxyl content such as 8 percent or more or a low hydroxyl content such as 0.1 to 1.5 percent by weight.

Accordingly, it is one object of the present invention to provide an efficient process for producing a silicone resin having trifunctional and difunctional units and a hydroxyl content that may vary anywhere from 1.5 to 8 percent by weight and an alkoxy content of 0.2 to 4.0 percent by weight.

It is an additional object of the present invention to provide an inexpensive process for the production of a silicone resin comprised of trifunctional and difunctional units where the silicone resin will be stable during the process of its formation and will not tend to gel.

It is yet another object of the present invention to provide a process for producing a silicone resin comprised of trifunctional and difunctional units which silicone resin will have superior properties and be produced by a simple process.

It is still another object of the present invention to provide a process for producing a silicone resin comprised of trifunctional units and difunctional units which process utilizes inexpensive starting materials.

These and other objects of the present invention are carried out by means of the process set forth herein below.

SUMMARY OF THE INVENTION

In accordance with the above objects, there is provided by the present invention a process for producing silicone resin comprising (a) contacting an organohalosilane selected from the class of organotrihalosilanes and diorganodihalosilanes where the organo group is selected from the class consisting of monovalent hydrocarbon radicals, halogenated monovalent hydrocarbon radicals and cyanoalkyl radicals with water and an alcohol of the formula, $$R'OH$$

where $R'$ is an alkyl radical of one to eight carbon atoms such that there is formed an alkoxylated organosiloxane containing 5 to 50 percent by weight of alkoxy groups; (b) adding an alcohol of the formula, $$R'OH$$

where $R'$ is as previously defined and removing acid from the alkoxylated organohalosiloxane by distillation or other procedures such that the resulting alkoxylated hydrolyzate has an acid concentration of 500 to 4,000 parts per million; (c) adjusting the acidity of the alkoxylated organohalosilane by the use of a strong base or by any other means to an acid concentration in the hydrolysis medium of 5 to 300 parts per million; (d) adding water and an alcohol of the formula, $$R'OH$$

where $R'$ is as previously defined to hydrolyze the alkoxylated organosiloxane and then by distillation or other means removing the water and adjusting the desired solids concentration of the resin in the alcohol solvent that is present, again by distillation or other evaporation procedures, In addition, a solvent or solvents may be added to the silicone resin product that is dissolved in the alcohol by-product that is formed in the above hydrolysis procedure such solvent being selected from the group of toluene, xylene, benzene and cyclohexane, octane, heptane, butyl acetate, naphtha solvents and mineral spirits, and the resulting mixture heated at elevated temperatures so as to distill water from the silicone resin that is dissolved in the solvent and so as to adjust the resin solids in the solvent at the desired concentration. Such a silicone resin that is formed will have a hydroxyl content of anywhere from 1.5 to 8 percent by weight. In addition, if it is desired to body the resin, the solids concentration in the solvent such as, heptane, octane, cyclohexane, benzene, toluene and xylene, is adjusted to 85 to 90 percent solids. A metal soap is added such as a metal octoate at minor concentrations to the silicone resin solids solution and the resulting mixture is heated at elevated temperatures from anywhere from 2 to 20 hours until the desired hydroxyl content of anywhere from 0.1 to 1.5 percent by weight is obtained and the viscosity of the resin is at the proper level. When the desired viscosity level is obtained in the bodied silicone resin, solvent may be added to the silicone resin solids solution so it may be adjusted to the desired silicone resin solids concentration and the resulting solution may then be filtered to give the desired bodied silicone resin product.

DETAILED DESCRIPTION OF THE PREFERRED EMBODIMENT

The present process and the desired silicone resins that are produced by the process of the present invention are obtained by hydrolyzing an organohalosilane selected from the group consisting of organotrihalosilanes, diorganodihalosilanes and mixtures thereof. As can be envisioned in such mixtures of organotrihalosilanes or diorganodihalosilanes or either one of these components that are utilized in the process of the present invention there may be present small amounts of tetrahalosilanes, hydrogen silanes and other such materials. As can be imagined these other materials result in the components of the organotrihalosilanes and the diorganodisilanes in small amounts and are present only as the result being present in small concentrations as a result of the process by which the organotrihalosilanes and the diorganodihalosilanes are produced.

Preferably, the organotrihalosilane is of the formula,

$$RSiX_3$$

and the diorganodihalosilane is of the formula,

$$R_2SiX_2$$

where X is halogen and preferably chlorine and R is selected from monovalent hydrocarbon radicals, halogenated monovalent hydrocarbon radicals and cyanoalkyl radicals. Thus, R may be selected from alkyl radicals such as methyl, ethyl, propyl, butyl, and etc.; alkenyl radicals such as, vinyl, allyl and etc.; cycloalkyl radicals such as, cyclohexyl, cycloheptyl, cyclooctyl and etc.; mononuclear aryl radicals such as, phenyl, and etc.; binuclear aryl radicals such as, naphthyl and etc.; aralkyl radicals such as, phenylethyl, phenylpropyl and etc.; and mononuclear alkaryl radicals such as, methylphenyl, ethylphenyl and etc. Preferably, the above formulas of the organotrihalosilanes and diorganodihalosilanes is selected from lower alkyl radicals of one to eight carbon atoms and mixtures of lower alkyl radicals of one to eight carbon atoms; alkenyl radicals such as, vinyl, allyl and phenyl radicals and mixtures of the above radicals. In the most preferred embodiment, the R radicals in the formula for the organotrihalosilanes and the diorganodihalosilanes is preferably selected from lower alkyl radicals of one to eight carbon atoms and phenyl radicals and mixtures of radicals within this group.

The R' radical in the formula for the alcohol that was given previously is preferably selected from lower alkyl radicals of one to eight carbon atoms; alkyloxyalkylene radicals of up to eight carbon atoms and cycloalkyl radicals such as, cyclohexyl, cycloheptyl, cyclooctyl of up to eight carbon atoms. Most preferably, the R' radical is selected from lower alkyl radicals of one to eight carbon atoms.

As can be envisioned in the process of the present invention, there may be utilized as the initial organohalosilane reactants either a reactant composed solely of organotrihalosilanes or a reaction mixture composed of a mixture of organotrihalosilanes and diorganodihalosilanes. In addition, from the above summary of the invention, it must be appreciated that the present process does away with the disadvantages of the prior art. Thus, in the first step of the process, there is provided a means of partially alkoxylating the mixture of organotrihalosilanes so as to stabilize the organohalosilanes, then the acidity of the alkoxylated organohalosilanes is reduced to a minimum so that the third step of the process can be carried out to obtain a stabilized silicone resin solution without the utilization of large quantities of water necessitating large vessels and without the utilization of expensive quantities of solvents. In the third step of the present process, the partially alkoxylated organohalosiloxanes of very minimal acidity are then hydrolyzed so as to obtain the desired silicone resin of the present case without necessitating the use of a completely alkoxylated organosilane initial reactant and without necessitating the uses of large quantities of solvent. Accordingly, in order to carry out the process of the present invention, the desired mixture of organohalosilanes is prepared, the desired mixture of organohalosilanes being based on the selection of the substituent groups in the organohalosilanes and the ratio of organotrihalosilanes to diorganodihalosilanes, that is, the ratio of the trifunctional units and the difunctional units, that is desired in the final resin product. Upon this organohalosilane mixture being selected there is mixed with the organohalosilanes, generally, 0.05 to 1 part of water and 0.1 to 1.0 parts of alcohol of the formula, R'OH, per part of the mixtures of organohalosilanes and the resulting mixture is thoroughly mixed and agitated at room temperature.

In the more preferable embodiment of the present invention, there is utilized 0.05 to 0.2 parts of water and 0.1 to 0.4 parts of alcohol per part of the mixture of organohalosilanes.

In the most preferred embodiment in the reaction, it is preferred to blend the methanol and water and add it to the chlorosilanes. This maintains the reaction mixture at room temperature or below room temperature which is preferred since the low boiling chlorosilanes are not given off as the result of temperature rises in the hydrolysis medium.

In another less preferred embodiment of the present invention, the mixture of organohalosilanes may be added to the methanol and water mixture but as a result of such a blending technique, the temperature of the hydrolysis medium rises at above room temperature and a portion of the organohalosilanes are boiled off resulting in a lower yield of the organohalosiloxanes.

Thus, in the most preferred embodiment of the present invention, the blend of methanol and water is added to the mixture of organohalosilanes so as to maintain the reaction mixture at room temperature or below. It is also preferable to have condensing units on the reaction kettle so as to return to the reaction vessel any chlorosilanes that may be inadvertently given off. During this reaction which goes on for a period of 0.5 to 2.0 hours, the reaction mixture is vigorously agitated. As the result of such a reaction there is produced an alkoxylated mixture of organohalosilanes which organoalkoxylated product has generally 5 to 40 percent by weight of alkoxy groups and more preferably 10 to 35 percent by weight of alkoxy groups. It is preferred to obtain this range of alkoxy groups since such alkoxylated organohalosiloxanes mixture results in the most preferred and the easiest intermediate for hydrolysis in the subsequent hydrolysis step in this process.

With respect to the quantities of water and alcohol specified above which is mixed with the organohalosilanes, it must be mentioned that if the quantity of water is above the ranges indicated above, a stable alkoxylated organohalosilane product is not obtained. If the amount of alcohol is too high then what is approached is a fully alkoxylated silane product which increases the expense of the process.

As soon as the above steps in the foregoing process are completed, then the reaction mixture is raised to a temperature which is the reflux temperature of the system which is generally about 60° to 80°C and at that point the mixture is heated at that temperature to give off hydrogen chloride that is formed during the alkoxylation step, which distillation is carried on with vigorous agitation. By means of this distillation at the reflux temperature of the hydrolysis mixture it is possible to reduce the concentration of the hydrogen chloride in the hydrolysis medium to 1 percent by weight hydrogen chloride or less. However, it is necessary to further reduce the hydrogen chloride concentration in the hydrolysis medium. The necessity for this is obvious. During the subsequent hydrolysis step that will be defined below, additional hydrogen chloride is given off and the combination of this hydrogen chloride would result in too high acidity being present in the system and make the system unstable.

Accordingly, after the alkoxylated organohalosiloxane has been distilled at the reflux temperature of 60° to 80°C, so that the hydrogen chloride concentration is decreased to 1 percent by weight of hydrogen chloride or less, there is added to the hydrogen chloride mixture, generally, 0.04 parts to 1.0 parts of an alcohol selected from the formula, R'O H, where R' is as previously defined, and more preferably 0.04 to 0.1 parts of the alcohol per part of the alkoxylated organohalosiloxanes. After the alcohol has been added, the mixture is heated to above 100°C and generally between 100°C and 150°C, and it is distilled at that temperature under vacuum and preferably about 100 millimeters of mercury vacuum until the hydrogen chloride concentration or the halogen acid concentration is reduced to 500 to 4,000 parts per million in the alkoxylated organohalosiloxane hydrolysis mixture. This distillation step is carried on preferably for anywhere from one-half to 4 hours or more preferably from one-half to 2 hours period of time. When this step is completed, it is still necessary to reduce further the acidity of the alkoxylated organohalosiloxanes hydrolysis medium and towards this objective there is added to the alkoxylated organohalosiloxane hydrolysis medium a base such as potassium hydroxide or sodium hydroxide or lithium hydroxide, that is, sufficient amounts of an alkali metal hydroxide, are added to the hydrolysis medium so as to reduce the acidity to between 1 to 300 parts per million of the halogen acid.

When this step is completed, it is then time to complete the hydrolysis of the alkoxylated organohalosiloxanes present in the hydrolysis medium. Accordingly, per one part of the alkoxylated material there is generally added 0.05 to 1.0 parts of an alcohol of the formula, R'O H where R' is as previously defined, and 0.04 to 1.0 parts of water. More preferably, per part of the alkoxylated organohalosiloxane mixture there is added 0.05 to 20 parts of the alcohol and 0.04 to 0.20 parts of water. Note that no alcohol need be added during this step of the process. However, the addition of the above quantities of alcohol along with water shortens the reaction time and does not necessitate extensive agitation of the reaction mixture. In this step, the alkoxylated material in the hydrolysis medium may either be added to the alcohol and water blend or the alcohol and water blend may be added to the alkoxylated material in the hydrolysis medium. No advantage is gained by utilizing any particular type of addition procedure. However, it is necessary after the addition is completed to thoroughly and vigorously agitate the mixture, and this agitation and mixing of these ingredients is carried on generally from 1½ to 4 hours and preferably from 1½ to 3 hours. It is not desired to let the mixture stand too long or continue the agitation for too long since the halogen acid that is present may cause condensing of silanol groups in the silicone resin that is formed. The alcohol that is added during this step of the hydrolysis is added basically for the purpose of solubilizing the silicone resin product that is formed. As can be envisioned, it is not desired to add too much alcohol since not only would that necessitate the use of large vessels and in addition make the process more expensive, but, further, in addition the additional alcohol would have to be distilled out in the final resin product to arrive at the desired solids content.

With respect to the water, it is, of course, obvious that the necessary stoichiometric amount of water has to be added to the hydrolysis medium to remove the alkoxy and halogen groups from the alkoxylated organohalosiloxanes so as to form the desired silicone resin. On the other hand, excessive amounts of water should not be used since this necessitates the use of large reaction vessels which increase the expense of the process. It is an object of the present invention to save space by utilizing as small a quantity of water as is necessary. Also, the addition of too much water goes against the solubilizing effect on the silicone resin that is created by the alcohol that is added such that the addition of too much water will result in the forming of two phases and necessitate at the end of the process the removal of the water by distillation and/or other means. All this results in increasing the expense of the process of the present invention.

Accordingly, if the process of the present invention has been carried out carefully there should result a silicone resin solution containing 60 to 80 percent solids of silicone resin dissolved in 20 to 40 percent alcohol. If minimal amounts of water are present in the final resin product of the present invention in accordance with the present process and if it is desired to utilize the silicone resin as dissolved in the alcohol solvent, then it is only necessary to distill off the excess alcohol and water at a temperature generally in the range of 60° to 100°C for 1½ to 2 hours, so that the desired solids content resin product is obtained. If it is desired to obtain a resin at 100 percent solids, all the alcohol and water are simply distilled off. If excessive amounts of water are present in the final silicone resin solutiom or if it is desired to utilize the resin as a solution in a different solvent other than the alcohol defined above, then the desired quantity of a solvent which may be selected from the group of toluene, xylene, benzene, cyclohexane, octane, heptane, butyl acetate, mineral spirits, naphtha solvents, and other well known hydrocarbon solvents may be added to the silicone resin solution. Then, the alcohol and water can be distilled out or separated from the silicone resin by distillation procedures so as to result in the desired silicone resin product being dissolved in one of the foregoing solvents in the desired solvents content. When these other solvents are added to the silicone resin alcohol solution, then the azeotroping out of the alcohol and the water is preferably carried out at a temperature in the range of 80° to 130°C.

With the utilization of this advantageous process of the present invention, there is obtained a silicone resin composed of trifunctional units and difunctional units where the organo substituent group to Si ratio varies from 1.0 to 1.9, where the ratio of the trifunctional units to difunctional units varies from 1.0 to 0 to 1.0 to 6.0. and the hydroxyl content of the resin varies from 1.5 to 8 percent by weight or more while the alkoxy content varies from 0.2 to 4.0 percent by weight. If the silicone resin that is produced has a high hydroxyl content such as above 1 percent by weight or more and does not have the desired viscosity and it is desired to increase the viscosity of the resin or reduce the hydroxyl content to 1.0 percent by weight or less, then the silicone resin product as obtained above may be bodied, thus, the resin may be checked to increase its viscosity in one of the solvents such as toluene, xylene, benzene, cyclohexane, butyl acetate, naphtha solvents and mineral spirits, and other suitable organic solvents and it is adjusted to a solids concentration of 85 to 90 percent by weight. There is then added to the silicone resin solids solution a catalyst which is preferably a metal soap catalyst such as, manganese octoate, cobalt octoate, iron octoate or zinc octoate. Generally, this catalyst is added to the silicone resin solids solution at a concentration of 0.005 percent to 0.04 percent by weight. The resulting solution is then heated at a temperature of 150° to 170°C for 2 to 20 hours and tested periodically until the hydroxyl content drops to the desired value in the range of 0.1 to 1.5 percent by weight, and the viscosity of the resin has reached the desired end point at which point the heating is discontinued. Then additional solvent is added to this silicone resin solids solution to bring the solids content to the desired value and the silicone resin is in proper form to be utilized. It also may be desirable at this point to filter the silicone resin solution to remove any impurities that may have formed in the solution, such as silicone resin aggolomerates that have precipitated out.

Accordingly, with this simple procedure and by the inexpensive process set forth above, it is possible to quickly and inexpensively produce a silicone resin in a very efficient manner. Such silicone resins that are produced by this process have many utilizations. Thus, they may be combined or reacted with an alkyd or a polyester to form a silicone resin, polyester copolymer which may be utilized in paints. In addition, the silicone resins of the present case may be utilized as paint intermediates in the formation of water protective coatings and in other well known uses for such silicone resins.

The present invention will now more specifically be described in terms of the following examples. These examples are presented here for the purpose of illustrating the invention and are not intended to describe a preferred or limiting embodiment of the present invention. All parts in the examples are by weight.

EXAMPLE 1

To a mixture of 1,242 parts (8.3 mols) of methyltrichlorosilane and 1,758 parts (8,3 mols) of phenyltrichlorosilane in a 5-liter flask was added with vigorous agitation a blend of 969 parts (30.3 mols) of methanol and 177 parts (9.8 mols) of water. Addition was effected over a 40-minute period. The temperature dropped to 0°C after one-half the methanol-water blend had been added and then warmed back up to room temperature during final addition. The reaction mixture was warmed to reflux (63°C) and refluxed for 15 minutes. Then 120 parts of methanol was added and the mixture stirred 5 minutes. It was then stripped to 95°C and 100 mm Hg pressure. Addition of 120 parts of methanol and stripping was repeated two more times at which stage the HCl concentration had been reduced to 50 ppm. Acidity was further reduced to 11 ppm HCl by stirring with $CaCO_3$ and additional methanol. Upon final stripping and filtration, the siloxane methoxylate had a methoxy content of 33.3 weight percent.

To 200 parts of the above methoxylate was added 26.4 parts of water and the mixture refluxed for 2 hours. After removing a portion of the methanol by distillation, 42 parts of toluene was added and the remaining water removed by azeotropic distillation. The resin solution was then stripped at atmospheric pressure to 125°C and held at 125°C while most of the remaining solvent was removed at reduced pressure. The molten resin was poured from the flask and cooled to a clear, hard, brittle resin. Analysis showed a hydroxyl content of 5.4 percent by weight and methoxy HCl. of 3.7 percent by weight.

EXAMPLE 2

To a chlorosilane blend consisting of 157 parts of methyltrichlorosilane, 443 parts of phenyltrichlorosilane, 135 parts of dimethyldichlorosilane and 265 parts of diphenyldichlorosilane was added a premixed blend of 154 parts of methanol and 70 parts of water. The addition was made with vigorous stirring and completed in 60 minutes. The reaction mixture was heated to reflux and held at reflux for 15 minutes to further rid the system of gaseous HCl. Then 40 parts of methanol was added and the system stripped to 90°C and 100 mm Hg pressure. Two additional 40 part portions of methanol were added with similar stripping after each addition. The siloxane methoxylate now showed acidity of 71 ppm HCl and methoxy content of 16.4 percent. The acidity was adjusted to 172 ppm HCl and 90 parts of methanol and 77 parts of water was added. The system was refluxed for 2½ hours with the pot temperature reaching 75°C. The reaction mixture was stripped to 100°C at 100 mm Hg pressure to remove methanol and water and the resin cut to 60 percent solids with toluene and xylene. The resin had a hydroxy content of 4.1 percent by weight and methoxy content of 2.9 percent by weight.

EXAMPLE 3

To 265 parts of methyltrichlorosilane, 663 parts of phenyltrichlorosilane, 645 parts of dimethyldichlorosilane and 928 parts of diphenyldichlorosilane which were charged to a 5-liter flask was added a mixture of 395 parts of methanol and 180 parts of water over a period of 105 minutes. The mixture was heated to reflux and held at reflux 15 minutes. Then 100 parts of methanol was added and the system stripped to 90°C at 100 mm Hg pressure. Addition of 100 parts of methanol and stripping was repeated two more times, at which stage acidity had been reduced to 110 ppm HCl. The siloxane methoxylate had a methoxy content of 16.8 percent by weight and was essentially free of hydroxyl groups.

To 300 parts of the above methoxylate was added 31 parts of methanol and 31.5 parts of water. The mixture was initially milky but upon being heated to reflux (pot temperature 72°C) and refluxing for 1 hour there was formed a clear solution. The solution was stripped to 92°C at 50 mm Hg pressure and adjusted to 90 percent by weight solids with toluene. To this resin there was added 0.23 parts of iron octoate solution (containing 6 percent iron) and a mixture of methanol and water azeotroped from the refluxing resin solution at a reflux temperature of 148° to 150°C. The resin solution slowly increased in viscosity. After 5 hours, heating was discontinued and the resin cut to 60 percent solids with toluene. The 60 percent solution had a viscosity of 245 centipoise. The hydroxyl content of the bodied resin based on resin solids was 0.9 percent by weight. A 1-mil film of resin on an aluminum panel showed a superior pencil hardness after 60 minutes cure at 250°C.

I claim:

1. A process for producing a silicone resin comprising (a) contacting an organohalosilane selected from the class consisting of organotrihalosilanes and diorganodihalosilanes and mixtures thereof, where the organo group is selected from the class consisting of monovalent hydrocarbon radicals and halogenated monovalent hydrocarbon radicals, with from 0.05 to 1 part of water based on per part of organohalosilane with from 0.1 to 1 part of an alcohol based on per part of said organohalosilane of the formula,

R'O H

where R' is an alkyl radical of one to eight carbon atoms such that there is formed an alkoxylated organosiloxane containing 5 to 40 percent by weight of alkoxy groups; (b) adding from 0.04 to 1.0 parts of an alcohol based on per part of the alkoxylated organohalosiloxanes of the formula,

R'O H

where R' is as previously defined and removing acid from alkoxylated organohalosiloxane to an acid concentration of 500 to 4000 ppm; (c) adjusting the acidity of the alkoxylated organohalosiloxane to 1 to 300 ppm; (d) adding from 0.04 to 1 part of water per part of said alkoxylated organohalosiloxanes to hydrolyze the alkoxylated organosiloxane; and (e) adjusting the resulting hydrolyzate to the desired solids content.

2. The process of claim 1 wherein in step (a) there is added 0.05 to 0.2 parts of water and 0.1 to 0.4 parts of the alcohol to one part of the organohalosilane and wherein the addition is carried out at room temperature.

3. The process of claim 1 wherein in step (b) 0.04 to 0.1 parts of alcohol are added per part of the alkoxylated organohalosiloxane and wherein said acid is removed by distillation under vacuum.

4. The process of claim 1 wherein in step (c) the acidity is adjusted by adding a base selected from the class consisting of KOH and NaOH.

5. The process of claim 1 wherein in step (d) there is added an alcohol at a concentration of 0.05 to 0.20 parts of the alcohol per part of the alkoxylated organohalosiloxane and 0.04 to 0.20 parts of water per part of said alkoxylated organosiloxane.

6. The process of claim 1 wherein in step (e) the hydrolyzate is heated to a temperature in the range of 60° to 100°C to remove all water and as much alcohol as is necessary to adjust the hydrolyzate to the desired solids content.

7. The process of claim 1 wherein the organo group is selected from the class consisting of methyl, vinyl and phenyl and R' is methyl.

8. A resin produced by the process of claim 1 which has an organo group to Si ratio of 1:1 to 1.9:1, a hydroxyl content of 1.5 to 8.0 percent by weight and an alkoxy content of 0.2 to 4.0 percent by weight.

9. The process of claim 1 further comprising adding a solvent selected from the class consisting of toluene, xylene, benzene and cyclohexane to said hydrolyzate and azeotroping out water and solvent at a temperature in the range of 80° to 130°C until the desired product is obtained.

10. The process of claim 9 further comprising adjusting the hydrolyzate to a concentration of 85 to 90 percent solids by distillation; adding 0.005 to 0.04 percent by weight of the hydrolyzate of a metal soap selected from the class consisting of manganese octoate, cobalt octoate, iron octoate, and zinc octoate; heating to reflux at a temperature of 150°C to 170°C for 2 to 20 hours until a resin product having 0.1 to 1.5 percent by weight of hydroxyl content is obtained.

11. The process of claim 10 further comprising adding a solvent to the resin selected from the class consisting of xylene, toluene, benzene, butyl acetate, naphtha solvents and mineral spirits and cyclohexane to adjust the resin solution to the proper solids concentration and filtering impurities from the solution.

* * * * *